United States Patent
Kim et al.

(10) Patent No.: US 9,447,236 B2
(45) Date of Patent: Sep. 20, 2016

(54) METHOD OF MANUFACTURING POLYALKYLENE CARBONATE

(71) Applicant: LG CHEM, LTD., Seoul (KR)

(72) Inventors: Yoon-Jung Kim, Daejeon (KR); Seung Young Park, Daejeon (KR); Taek-Jun Jung, Daejeon (KR); Yun-Ki Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/421,091

(22) PCT Filed: May 27, 2014

(86) PCT No.: PCT/KR2014/004727
§ 371 (c)(1),
(2) Date: Feb. 11, 2015

(87) PCT Pub. No.: WO2014/193144
PCT Pub. Date: Dec. 4, 2014

(65) Prior Publication Data
US 2015/0218310 A1    Aug. 6, 2015

(30) Foreign Application Priority Data

May 27, 2013 (KR) .......... 10-2013-0059876
May 27, 2014 (KR) .......... 10-2014-0063539

(51) Int. Cl.
*C08G 59/00* (2006.01)
*C08G 64/34* (2006.01)
*B01J 31/22* (2006.01)

(52) U.S. Cl.
CPC ............ *C08G 64/34* (2013.01); *B01J 31/22* (2013.01); *B01J 31/2243* (2013.01); *B01J 2231/14* (2013.01); *B01J 2531/025* (2013.01); *B01J 2531/845* (2013.01)

(58) Field of Classification Search
CPC .............................. C08G 64/34; C09B 57/10
USPC .......... 558/277, 260; 568/905; 528/395, 405
See application file for complete search history.

(56) References Cited

U.S. PATENT DOCUMENTS

| 2010/0324260 A1 | 12/2010 | Jeong et al. | |
| 2011/0207899 A1* | 8/2011 | Allen | C08G 64/406 528/405 |
| 2012/0123066 A1* | 5/2012 | Fujimoto | C08G 64/42 525/461 |

FOREIGN PATENT DOCUMENTS

| CN | 1887934 A | 1/2007 |
| CN | 101062974 A | 10/2007 |

(Continued)

OTHER PUBLICATIONS

Wei-Min Ren et al., "Mechanistic Aspects of the Copolymerization of CO2 with Epoxides Using a Thermally Stable Single-Site Cobalt(III) Catalyst," J. Am. Chem. Soc. 2009, 131, 11509-11518.

*Primary Examiner* — Shane Fang
(74) *Attorney, Agent, or Firm* — Dentons US LLP

(57) ABSTRACT

The present invention relates to a method of manufacturing polyalkylene carbonate. More specifically, the method of manufacturing polyalkylene carbonate includes solution-polymerizing an epoxide compound and carbon dioxide in the presence of a cobalt complex having a neutral singe-site as a catalyst and a solvent, thereby providing stability and adjusting degree of polymerization and being advantageous for performing a post-treatment process after polymerization.

9 Claims, 1 Drawing Sheet

(56) References Cited

FOREIGN PATENT DOCUMENTS

| | | |
|---|---|---|
| CN | 101412809 A | 4/2009 |
| CN | 101565502 A | 10/2009 |
| CN | 102076738 A | 5/2011 |
| CN | 102164987 A | 8/2011 |
| CN | 102786677 A | 11/2012 |
| CN | 102884103 A | 1/2013 |
| EP | 2157116 A | 2/2010 |
| JP | 2010-001443 A | 1/2010 |
| JP | 2010-270278 A | 12/2010 |
| JP | 2012500867 A | 1/2012 |
| KR | 10-2010-0013255 A | 2/2010 |
| KR | 10-2011-0079622 A | 7/2011 |
| KR | 10-2012-0034813 A | 4/2012 |
| KR | 10-2013-0044223 A | 5/2013 |
| KR | 1020140142925 A | 12/2014 |
| WO | 2010022388 A2 | 2/2010 |
| WO | 2011-004730 A1 | 1/2011 |
| WO | 2013012895 A1 | 1/2013 |

* cited by examiner

METHOD OF MANUFACTURING POLYALKYLENE CARBONATE

This application is a National Stage entry of International Application No. PCT/KR2014/004727 filed on May 27, 2014, which claims priority to Korean Patent Application Nos. 10-2013-0059876 filed on May 27, 2013 and 10-2014-0063539 filed on May 27, 2014, with the Korean Intellectual Property Office, all of which are incorporated herein in their entirety by reference.

TECHNICAL FIELD

The present invention relates to a method of manufacturing polyalkylene carbonate including solution-polymerizing an epoxide compound and carbon dioxide.

BACKGROUND ART

Polyalkylene carbonate is a polymer material useful for being used as a packing material, a coating material, and the like. In order to prepare the polyalkylene carbonate, a method of preparing the polyalkylene carbonate from an epoxy compound and carbon dioxide is known, wherein the method has an environmentally friendly high value in that phosgene being a noxious compound is not used and carbon dioxide is capable of being obtained in the air. Accordingly, many researchers have developed various types of catalysts in order to prepare polyalkylene carbonate from the epoxy compound and the carbon dioxide.

Since 2000, the development has significantly advanced in fields for developing the catalysts. Among them, development of a binary catalyst system using a mixture of a (Salen)Co compound or a (Salen)Cr compound [H$_2$Salen=N,N'-bis(3,5-dialkylsalicylidene)-1,2-cyclohexanediamine)], and an onium salt such as [R$_4$N]Cl or PPNCl (bis(triphenylphophine)iminium chloride) or a base such as amine or phosphine is representative. With respect to the binary catalyst system of the (Salen)Co compound, a mechanism in which epoxide is coordinated to the metal center having a lewis acid group to be activated, and nucleophilic-attack is performed thereon by carbonate anions derived from an onium salt or a bulky amine base was suggested.

Meanwhile, Chinese Patent Application Publication No. 101412809 discloses a method of synthesizing a salen-typed Co complex catalyst including one or two dimensionally large neutral organic base group(s) (TBD) and a method of preparing polyalkylene carbonate by copolymerizing an epoxide compound and carbon dioxide by using the same.

However, in the above-mentioned methods, copolymerization only using a bulk polymerization is disclosed. In the bulk polymerization, a catalytic activity is excellent; however, after the polymerization is completed, it is difficult to perform post-treatment processes such as control of side reactions in self-polymerization of epoxide, cleaning of a reactor, and removal of metal residue in the polymer, such that scale up is not easily conducted.

SUMMARY OF INVENTION

Technical Problem

The present invention has been made in an effort to provide a method of manufacturing polyalkylene carbonate capable of maintaining high selectivity, providing stability and adjusting degree of polymerization of reactants, and in particular, being advantageous for performing a post-treatment process after polymerization as compared to a case of performing bulk-polymerization, by preparing a binary copolymer of an epoxide compound and carbon dioxide through solution-polymerization in the presence of a specific cobalt complex having a neutral singe-site catalyst.

Solution to Problem

An exemplary embodiment of the present invention provides a method of manufacturing polyalkylene carbonate including: solution-polymerizing an epoxide compound and continuously or non-continuously injected carbon dioxide in the presence of a catalyst represented by the following Chemical Formula 1 and a solvent, wherein the solvent is selected from the group consisting of ethylene dichloride, benzene and hexane:

[Chemical Formula 1]

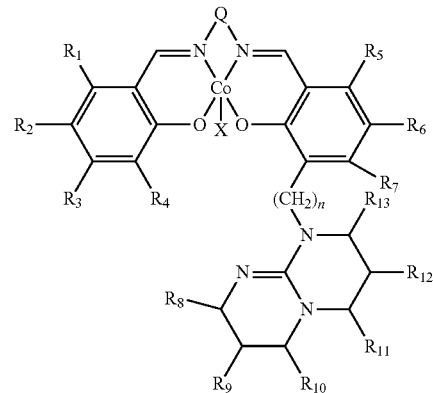

in Chemical Formula 1,

Q is C1-C20 alkylene, C3-C20 cycloalkylene, C6-C30 arylene, or C1-C20 dioxy radical, including or not including halogen, nitrogen, oxygen, silicon, sulfur, or phosphorus atom, $R_1$ to $R_7$ are each independently or simultaneously, hydrogen; or a C1-C20 alkyl group, a C2-C20 alkenyl group, a C7-C20 alkylaryl group, or a C7-C20 arylalkyl group, including or not including at least one of halogen, nitrogen, oxygen, silicon, sulfur, and phosphorus atom, $R_8$ to $R_{13}$ are each independently hydrogen or a C1-C20 alkyl group, n is an integer of 1 to 10, and X is —Cl, —NO$_3$ or —OAc.

The solvent may be used at a weight ratio of 1:0.1 to 1:20 based on the epoxide compound.

In Chemical Formula 1, $R_1$, $R_3$, $R_5$ and $R_7$ may be each independently hydrogen or a C1-C20 alkyl group, $R_2$, $R_4$ and $R_6$ may be each independently a C1-C20 alkyl group, Q may be C3-C20 cycloalkylene, n may be an integer of 1 to 10, and X may be —Cl, —NO$_3$ or —OAc.

In Chemical Formula 1, $R_1$, $R_3$, $R_5$ and $R_7$ may be each independently hydrogen, $R_2$, $R_4$ and $R_6$ may be each independently a tert-butyl group, and Q may be C3-C20 cycloalkylene. The carbon dioxide may be injected at a weight ratio of 0.5:1 to 10:1 based on the epoxide compound.

The solution-polymerizing may be performed at a temperature of 50 to 100° C. for 30 minutes to 9 hours.

In the solution-polymerizing, an ammonium salt selected from the group consisting of $(n-Bu)_4NY$ (wherein $Y=Cl$ or OAc), [PPN]Cl, [PPN]Br and [PPN]$N_3$ may be further included as a cocatalyst, as needed.

The epoxide compound may be at least one kind selected from the group consisting of C2-C20 alkylene oxide substituted or unsubstituted with halogen or a C1-C5 alkyl; C4-C20 cycloalkylene oxide substituted or unsubstituted with halogen or a C1-C5 alkyl group; and C8-C20 styrene oxide substituted or unsubstituted with halogen or a C1-C5 alkyl group. The epoxide compound may include C2-C20 alkylene oxide substituted or unsubstituted with halogen or a C1-C5 alkyl group, and may have a carbonate linkage selectivity of 99% or more.

The polyalkylene carbonate may include polyethylene carbonate having a weight average molecular weight of 1000 to 500,000.

Advantageous Effects of Invention

According to the present invention, stability may be excellent and degree of polymerization may be adjusted by using a specific cobalt complex having a neutral single-site catalyst as a catalyst and by performing copolymerization in solution at the time of manufacturing polyalkylene carbonate using an epoxide compound and carbon dioxide, as compared to the existing bulk polymerization. In addition, according to the method of the present invention, it is easy to perform control of self-polymerization, cleaning of a reactor, and removal of metal residue in the polymer by decreasing concentration and viscosity of the epoxide compound after completing the polymerization, such that the method of the present invention is advantageous for performing a post-treatment process as compared to the bulk polymerization.

DESCRIPTION OF EMBODIMENTS

Figure 1:
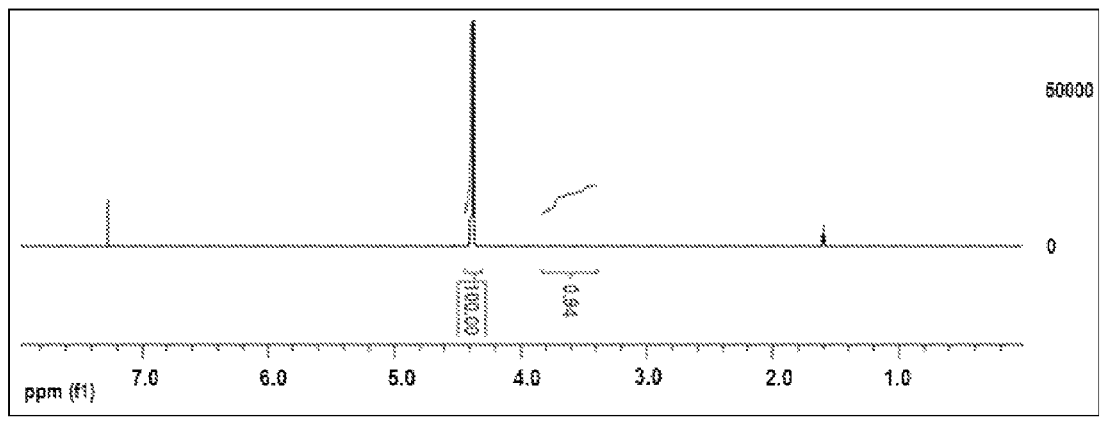
FIG. 1 shows $^1H$ NMR spectrum result of a polymer obtained by Example 1 of the present invention.

Hereinafter, the present invention will be described in more detail. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to appropriately describe the best method he or she knows for carrying out the invention.

According to exemplary embodiments of the present invention, there is provided a method of manufacturing polyalkylene carbonate including solution-polymerizing an epoxide compound and continuously or non-continuously injected carbon dioxide in the presence of a catalyst represented by the following Chemical Formula 1 and a solvent, wherein the solvent is selected from the group consisting of ethylene dichloride, benzene and hexane:

[Chemical Formula 1]

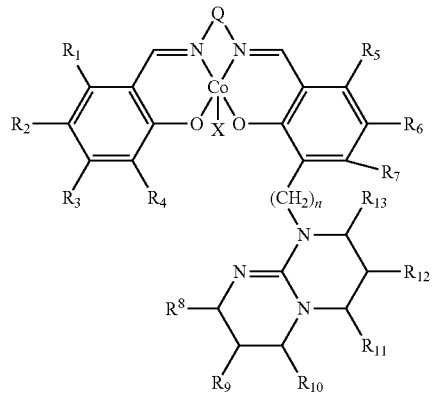

in Chemical Formula 1,

Q is C1-C20 alkylene, C3-C20 cycloalkylene, C6-C30 arylene, or C1-C20 dioxy radical, including or not including halogen, nitrogen, oxygen, silicon, sulfur, or phosphorus atom, $R_1$ to $R_7$ are each independently or simultaneously, hydrogen; or a C1-C20 alkyl group, a C2-C20 alkenyl group, a C7-C20 alkylaryl group, or a C7-C20 arylalkyl group, including or not including at least one of halogen, nitrogen, oxygen, silicon, sulfur, and phosphorus atom, $R_8$ to $R_{13}$ are each independently hydrogen or a C1-C20 alkyl group, n is an integer of 1 to 10, and X is —Cl, —$NO_3$ or —OAc.

In the method of manufacturing the polyalkylene carbonate using the epoxide compound and the carbon dioxide, a method of solution-polymerizing using a specific solvent and a catalyst is provided.

That is, in the related art, since the bulk polymerization is mainly used at the time of manufacturing the polyalkylene carbonate, reaction time is long or side reactions largely occur, such that after the polymerization is completed, post-treatment processes are essentially required. However, in the present invention, after the polymerization is completed, since it is easy to perform control of self-polymerization, removal of a polymer from a reactor, and removal of metal residue in the polymer, the method of the present invention is more advantageous for performing the post-treatment processes as compared to the bulk polymerization.

In addition, even though polymerization activity of the catalyst according to the method of the present invention corresponds to ⅓ of that of the existing bulk polymerization; however, according to the present invention, excellent thermal stability may be secured and a degree of polymerization may be easily adjusted.

In particular, in the present invention, high carbonate linkage is maintained and after the reaction, TSC of solution is decreased to maintain viscosity of the solution at a relatively low state, such that it is easy to transfer the polymer solution to the post-treatment process. In addition, according to the present invention, additional processes such as removing catalyst residue from the polymer may be easily performed.

In the solution-polymerizing method according to an exemplary embodiment of the present invention, the specific solvent is deduced according to a method of directly polymerization screening candidate solvents. The specific solvent is preferably selected from the group consisting of ethylene dichloride, benzene and hexane as described above.

Since the ethylene dichloride has solubility to the polyalkylene carbonate, after the polymerization is completed, the polycarbonate may be contained in the solvent, such that the transfer is smoothly performed. Therefore, according to the present invention, since the final polymer may be transferred in a state in which the polymer is contained in the solution, a problem that the polyalkylene carbonate prepared by the existing bulk polymerization has a low mobility may be solved.

In addition, even though hexane is insoluble to the polyalkylene carbonate, the solution-polymerization is achieved, such that after the polymerization is completed, the final polymer may be simply obtained by removing hexane through filtration.

Here, if using other solvents at the time of solution-polymerization, since deactivation of the catalyst is accelerated and the polymerization reaction is not performed at all, the polyalkylene carbonate including a binary copolymer of the epoxide compound and carbon dioxide may not be prepared.

The solvent is preferably used at a weight ratio of 1:0.1 to 1:20 based on the epoxide compound. Here, when the ratio is less than 1:0.1, which is extremely decreased, as the polymerization proceeds, TSC and viscosity are rapidly increased, such that the polymerization reaction is not uniformly performed, and mechanical overload occurs in a motor of the reactor, and therefore, the effect of the solution-polymerization may not be shown. In addition, when the ratio is more than 1:20, yield and molecular weight are decreased.

In a preferred exemplary embodiment of the present invention, the catalyst represented by Chemical Formula 1 above is a cobalt complex having a neutral single-site catalyst, and may have high reactivity and selectivity as compared to the existing complex used as the catalyst at the time of copolymerization of the polyalkylene carbonate.

In the complex represented by Chemical Formula 1, X is more preferably —NO₃ or —OAc.

In addition, in Chemical Formula 1 above, $R_1$, $R_3$, $R_5$ and $R_7$ are each independently hydrogen or a C1-C20 alkyl group, or more preferably, hydrogen or a C1-C10 alkyl group, and $R_2$, $R_4$ and $R_6$ are each independently a C1-C20 alkyl group, or more preferably, a C1-C10 alkyl group. Most preferably, $R_1$, $R_3$, $R_5$ and $R_7$ are each independently hydrogen, and $R_2$, $R_4$ and $R_6$ are each independently a tert-butyl group.

Further, in Chemical Formula 1 above, n may be an integer of 1 to 10, and more preferably, an integer of 2 to 5.

In Chemical Formula 1 above, Q may be C3-C20 cycloalkylene, and more preferably, a 1,2-cyclohexylene group.

Therefore, the complex of the present invention may have a structure represented by the following Chemical Formula 1-1 according to the preferred exemplary embodiment:

[Chemical Formula 1-1]

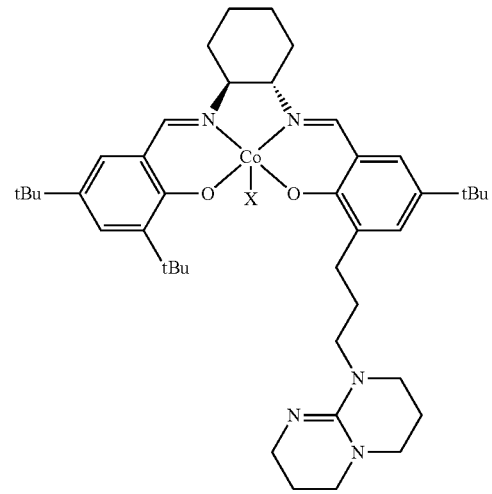

in Chemical Formula 1-1, X is —NO₃ or —OAc.

In addition, the catalyst may be used at a molar ratio of 1:500 to 100000 based on the epoxide compound, and more preferably, at a molar ratio of 1:10000 to 1:60000. Here, when the ratio is less than 1:500 based on the catalyst, an amount of the used catalyst is large, such that it is not easy to remove the catalyst after the polymerization, and after performing the polymerization, catalyst residue may induce back biting. In addition, when the ratio is more than 1:100,000 based on the catalyst, the catalyst has a low concentration, such that the reaction time is long and final yield is decreased.

Further, the epoxide compound in the present invention may be at least one kind selected from the group consisting of C2-C20 alkylene oxide substituted or unsubstituted with halogen or a C1-C5 alkyl group; C4-C20 cycloalkylene oxide substituted or unsubstituted with halogen or a C1-C5 alkyl group; and C8-C20 styrene oxide substituted or unsubstituted with halogen or a C1-C5 alkyl group. More preferably, the epoxide compound includes C2-C20 alkylene oxide substituted or unsubstituted with halogen or a C1-C5 alkyl group, and has a carbonate linkage selectivity of 99% or more.

In addition, specific examples of the epoxide compound according to the present invention include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, and the like. Preferably, the epoxide compound is ethylene oxide.

In addition, in the solution-polymerizing, an ammonium salt selected from the group consisting of (n-Bu)₄NY (wherein Y=Cl or OAc), [PPN]Cl, [PPN]Br and [PPN]N₃ may be further included as a cocatalyst.

Further, in the method of manufacturing the polyalkylene carbonate according to an exemplary embodiment of the present invention, examples of the method of polymerizing the polyalkylene carbonate include batch type polymerization, a semi-batch type polymerization, or continuous type polymerization.

In addition, the carbon dioxide may be injected at a weight ratio of 0.5:1 to 10:1 based on the epoxide compound.

Further, a pressure of the carbon dioxide in the solution-polymerization manufacturing the polyalkylene carbonate may be 100 atmospheric pressure at normal pressure, and preferably, 2 to 50 atmospheric pressure.

The carbon dioxide may be continuously or non-continuously injected during the reaction; however, the continuous injection is preferred, and in this case, a semi-batch type or a closed batch system is preferably used as a polymerization reactor. At the time of continuously injecting the carbon dioxide in the polymerization, reaction pressure may be 5 to 50 bar, or 10 to 40 bar.

Meanwhile, the solution-polymerization may be performed at a temperature of 50 to 100° C. In addition, since self-polymerization temperature of the epoxide compound, preferably, ethylene oxide is 90° C., the solution-polymerization is more preferably performed at a temperature of 60 to 80 t in order to decrease an amount of by-products such as polyalkylene glycol, and the like, caused by the self-polymerization.

Further, experiments known in the related art state that time required for the polymerization is 20 hours or more; however, in this case, the polymerization reaction time is excessively long, which is not desirable, and at the time of the reaction at a high temperature for a long time (for example, 20 hours), cyclic carbonate is formed by back biting on a medium, and a molecular weight of the thus-obtained polymer may be rather decreased.

However, with the combination of the above-described solvent with the catalyst at the time of solution-polymerization according to the present invention, the polymerization reaction may be performed for 6 hours or less, and more preferably, 30 minutes to 9 hours, and the most preferably, 3 to 5 hours. That is, according to the present invention, the epoxide compound may have the same level of conversion ratio as that of the related art even with a short polymerization time, and the by-products may be less formed.

The polyalkylene carbonate prepared by one exemplary embodiment of the present invention is a binary copolymer of ethylene oxide and carbon dioxide, and may include polyethylene carbonate having a weight average molecular weight of 1000 to 500,000. In addition, according to the present invention, TOF of the polyalkylene carbonate is 300 to 1500 (mol/mol-cat·hr), and since the number of reacting molecules per unit activity point per a unit time is large, sufficient activity for manufacturing the polyalkylene carbonate may be shown.

Hereinafter, preferably exemplary embodiments of the present invention will be described in detail. However, these examples are only to illustrate the present invention and are not to be construed as limiting a scope of the present invention.

Examples 1 and 2 and Comparative Examples 1 to 6

Polyethylene carbonate was prepared by solution-polymerizing ethylene oxide and continuously injected carbon dioxide using a cobalt catalyst represented by the following Chemical Formula 1-1 and a solvent. Polymerization conditions and results of Examples 1 and 2 were shown in the following Table 1. In addition, ¹H NMR spectrum results of the polyethylene carbonates prepared by Examples 1 and 2 were shown in FIGS. 1 and 2, respectively. Further, polymerization conditions and results of Comparative Examples 1 to 6 were shown in the following Table 2.

[Chemical Formula 1-1]

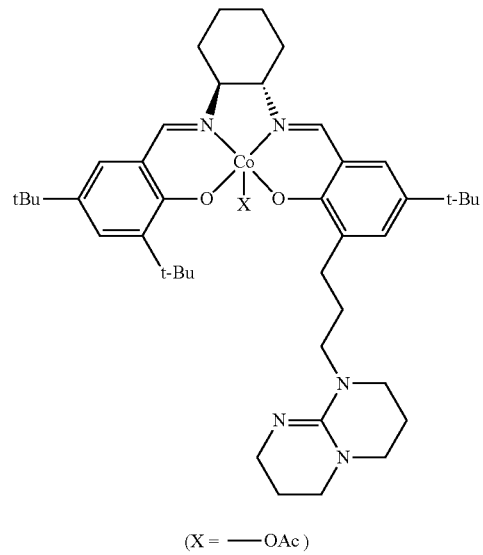

(X = —OAc)

TABLE 1

|  |  | Example 1 | Example 2 |
| --- | --- | --- | --- |
| Cat. amt | (g) | 0.0033 | 0.0036 |
| Cat. amt | (mmol) | 0.0042 | 0.0046 |
| EO | (mL) | 14.26 | 8.87 |
| EO | (g) | 12.58 | 7.82 |
| EO | (mol) | 0.29 | 0.18 |
| Solvent | Kind | Hexane | 1,2-EDC |
|  | (g) | 3.50 | 4.01 |
| EO/cat. |  | 68002 | 38774 |
| $CO_2$ | (bar) | 20 | 20 |
| $CO_2$ | (g) | 6.58 | 2.10 |
| Temperature | (° C.) | 70 | 70 |
| Time | (h) | 3 | 3 |
| Yield | (g) | 1.160 | 1.120 |
| Yield | (g/g-cat) | 352 | 311 |
| Activity | (g/g-cat · hr) | 117.1725 | 103.704 |
| Conversion Ratio of EO | (%) | 5 | 7 |
| TOF | (mol/mol-cat · hr) | 1045.89 | 925.67 |
| Mn | (g/gmol) | 34583 | 53612 |
| Mw | (g/gmol) | 43948 | 79696 |
| PDI |  | 1.27 | 1.49 |

Note)
* 1,2-EDC: 1,2-ethylene dichloride
** Turnover Frequency means the number of reacting molecules per unit activity point per a unit time, respectively, and is obtained by calculation using TON (turnover number), that is, the number of reacting molecules per unit activity point per a unit time.

TABLE 2

| | Comparative Example 1 | Comparative Example 2 | Comparative Example 3 | Comparative Example 4 | Comparative Example 5 | Comparative Example 6 |
|---|---|---|---|---|---|---|
| Cat · amt (mg) | 3.3 | 3.5 | 3.6 | 3.2 | 3.1 | 3.4 |
| Cat · amt (μmol) | 4.2 | 4.5 | 4.6 | 4.1 | 3.9 | 4.3 |
| EO (g) | 10.85 | 11.10 | 7.82 | 13.72 | 10.80 | 4.58 |
| EO/cat. | 58665 | 56607 | 38774 | 76520 | 62135 | 24022 |
| Solvent Kind | MC | MeCN | 1,4-dioxane | Toluene | Nitromethane | DMF |
| (g) | 6.49 | 4.14 | 4.00 | 4.75 | 4.15 | 12.69 |
| $CO_2$ (bar) | 20 | 20 | 20 | 20 | 20 | 20 |
| Temperature (° C.) | 70 | 70 | 70 | 70 | 70 | 70 |
| Time (hr) | 3 | 3 | 3 | 3 | 3 | 3 |
| Yield (g) | — | — | — | — | — | — |
| Yield (g/g-cat.) | — | — | — | — | — | — |
| TOF (mol/mol-cat · hr) | — | — | — | — | — | — |

Note)
MC: methylene chloride, MeCN: acetonitrile, DMF: dimethylformamide

It could be confirmed from Tables 1 and 2 above that when the solution-polymerization is performed by using the catalyst having a neutral singe-site and 1,2-EDC or hexane as the solvent, the copolymerization of EO/$CO_2$ could be generated. Therefore, it could be confirmed that the 1,2-EDC or hexane has significantly decreased deactivation effect on the catalyst itself, and also has solubility or non-solubility to the polyalkylene carbonate, in particular, polyethylene carbonate, respectively, and therefore, when manufacturing the polyalkylene carbonate by the solution-polymerization, the 1,2-EDC or hexane is sufficiently useful as the solvent.

Figure 2:
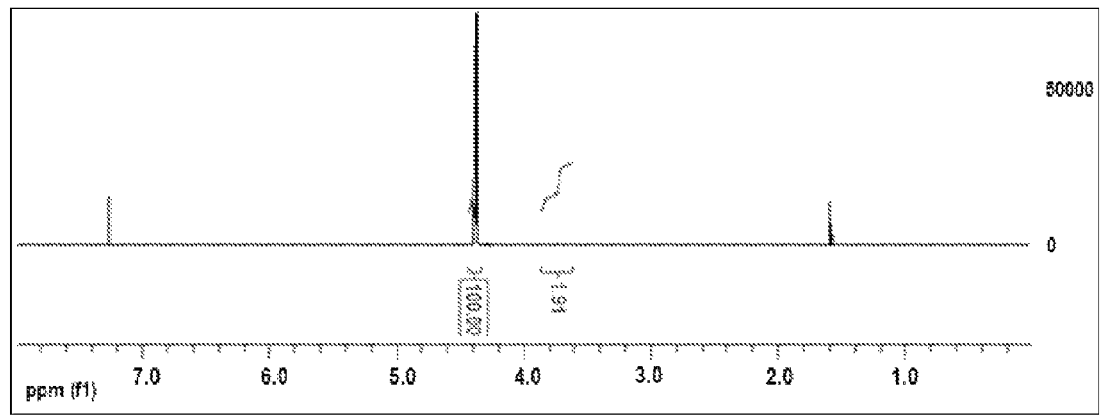
FIG. 2 shows $^1H$ NMR spectrum result of a polymer obtained by Example 2 of the present invention.

In addition, as shown in FIGS. 1 and 2, it could be confirmed from Examples 1 and 2 that alternate copolymerization of the ethylene oxide and the carbon dioxide was favorably achieved to prepare the polyethylene carbonate. Further, it could be confirmed that even at the time of solution-polymerization, addition peaks of polyalkylene glycol, cyclic carbonate, and the like, were shown as a trace amount which is less than 1% based on the combination of the polyalkylene carbonate.

Meanwhile, when using the solvent of Comparative Examples 1 to 6, the copolymerization was not achieved at all, such that yield and TOF results could not be measured. Therefore, it could be confirmed that even though the solvent is polar or non-polar, when the specific solvent is not used at the time of solution-polymerization, the polyalkylene carbonate could not be prepared.

The present invention has been described in detail based on particular features thereof, and it is obvious to those skilled in the art that these specific technologies are merely preferable embodiments and thus the scope of the present invention is not limited to the embodiments. Therefore, the substantial scope of the present invention will be defined by the accompanying claims and their equivalents.

What is claimed is:

1. A method of manufacturing polyalkylene carbonate comprising:
    solution-polymerizing an epoxide compound and continuously or non-continuously injected carbon dioxide in the presence of a catalyst represented by the following Chemical Formula 1 and 1,2-ethylene dichloride as a solvent,
    wherein the solvent is used at a weight ratio of 1:0.1 to 1:0.51 based on the epoxide compound:

[Chemical Formula 1]

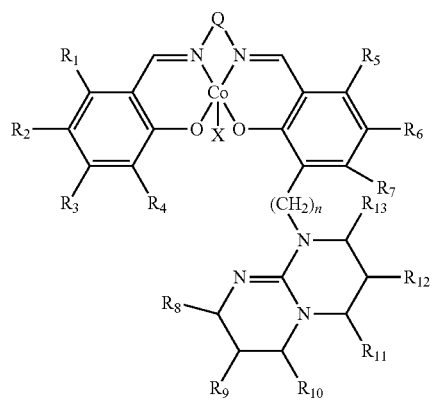

in Chemical Formula 1,
Q is C1-C20 alkylene, C3-C20 cycloalkylene, C6-C30 arylene, or C1-C20 dioxy radical, including or not including halogen, nitrogen, oxygen, silicon, sulfur, or phosphorus atom,
$R_1$ to $R_7$ are each independently or simultaneously, hydrogen; or a C1-C20 alkyl group, a C2-C20 alkenyl group, a C7-C20 alkylaryl group, or a C7-C20 arylalkyl group, including or not including at least one of halogen, nitrogen, oxygen, silicon, sulfur, and phosphorus atom,
$R_8$ to $R_{13}$ are each independently hydrogen or a C1-C20 alkyl group,
n is an integer of 1 to 10, and
X is –Cl, –$NO_3$ or –OAc.

2. The method of claim 1, wherein in Chemical Formula 1, $R_1$, $R_3$, $R_5$ and $R_7$ are each independently hydrogen or a C1-C20 alkyl group, $R_2$, $R_4$ and $R_6$ are each independently a C1-C20 alkyl group, Q is C3-C20 cycloalkylene, n is an integer of 1 to 10, and X is —Cl, —$NO_3$ or —OAc.

3. The method of claim 2, wherein in Chemical Formula 1, $R_1$, $R_3$, $R_5$ and $R_7$ are each independently hydrogen, $R_2$, $R_4$ and $R_6$ are each independently a tert-butyl group, and Q is C3-C20 cycloalkylene.

4. The method of claim 1, wherein the carbon dioxide is injected at a weight ratio of 0.5:1 to 10:1 based on the epoxide compound.

5. The method of claim 1, wherein the solution-polymerizing is performed at a temperature of 50 to 100° C. for 30 minutes to 9 hours.

6. The method of claim 1, wherein in the solution-polymerizing, an ammonium salt selected from the group consisting of (n-Bu)$_4$NY (wherein Y=Cl or OAc), [PPN]Cl, [PPN]Br and [PPN]N$_3$ is further included as a cocatalyst.

7. The method of claim 1, wherein the epoxide compound is at least one kind selected from the group consisting of C2-C20 alkylene oxide substituted or unsubstituted with halogen or a C1-C5 alkyl group; C4-C20 cycloalkylene oxide substituted or unsubstituted with halogen or a C1-C5 alkyl group; and C8-C20 styrene oxide substituted or unsubstituted with halogen or a C1-C5 alkyl group.

8. The method of claim 1, wherein the epoxide compound includes C2-C20 alkylene oxide substituted or unsubstituted with halogen or a C1-C5 alkyl group, and has a carbonate linkage selectivity of 99% or more.

9. The method of claim 1, wherein the polyalkylene carbonate includes polyethylene carbonate having a weight average molecular weight of 1000 to 500,000.

* * * * *